(12) United States Patent
Ross et al.

(10) Patent No.: US 10,260,420 B2
(45) Date of Patent: Apr. 16, 2019

(54) LUBRICATION SYSTEM FOR A RECONFIGURABLE GAS TURBINE ENGINE

(71) Applicant: Rolls-Royce Corporation, Indianapolis, IN (US)

(72) Inventors: John W. Ross, Franklin, IN (US); Christine E. Carter, Belleville, MI (US); John Yamashita, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 552 days.

(21) Appl. No.: 15/094,516

(22) Filed: Apr. 8, 2016

(65) Prior Publication Data

US 2016/0341124 A1 Nov. 24, 2016

Related U.S. Application Data

(60) Provisional application No. 62/163,700, filed on May 19, 2015.

(51) Int. Cl.
| | |
|---|---|
| *F01D 25/18* | (2006.01) |
| *F02C 7/06* | (2006.01) |
| *F16K 11/074* | (2006.01) |
| *F04B 41/02* | (2006.01) |
| *F01M 11/06* | (2006.01) |
| *F01D 25/20* | (2006.01) |

(52) U.S. Cl.
CPC ............... *F02C 7/06* (2013.01); *F01D 25/18* (2013.01); *F01D 25/20* (2013.01); *F01M 11/067* (2013.01); *F04B 41/02* (2013.01); *F16K 11/074* (2013.01); *F05D 2220/32* (2013.01); *F05D 2230/60* (2013.01); *F05D 2260/98* (2013.01)

(58) Field of Classification Search
CPC . F02C 7/06; F01D 25/18; F01D 25/20; F01D 25/24; F01M 11/06; F01M 11/067; F01M 37/106; F05D 2260/98; F04B 41/02; Y10T 137/87708; Y10T 137/87788; Y10T 137/87812; Y10T 137/8782; F16K 11/06; F16K 11/072; F16K 11/074; F16K 11/0746; F16K 11/065; F16K 11/0655
See application file for complete search history.

(56) References Cited

U.S. PATENT DOCUMENTS

| | | | |
|---|---|---|---|
| 3,857,461 A * | 12/1974 | Schmitt ............... | B62D 55/125 184/6.2 |
| 4,825,825 A | 5/1989 | Chino et al. | |
| 4,891,934 A | 1/1990 | Huelster | |
| 7,631,485 B2 | 12/2009 | Suciu et al. | |

(Continued)

FOREIGN PATENT DOCUMENTS

DE 2557888 A1 6/1977

OTHER PUBLICATIONS

Extended European Search Report, European Application No. 16167376. 9-1603, dated Oct. 5, 2016, 7 pages.

*Primary Examiner* — Steven Sutherland
(74) *Attorney, Agent, or Firm* — Barnes & Thornburg LLP (57) ABSTRACT

According to the present disclosure, a gas turbine assembly includes a gas turbine engine and a gearbox. The gearbox includes a lubrication system including a first sump and a second sump. The lubrication system is configurable to use either of the first and second sumps to correspond to various configurations of the gas turbine assembly.

20 Claims, 5 Drawing Sheets

(56) References Cited

U.S. PATENT DOCUMENTS

| | | |
|---|---|---|
| 7,886,875 B2 | 2/2011 | Shevchencko et al. |
| 8,083,030 B2 | 12/2011 | Portlock |
| 8,256,576 B2 | 9/2012 | Glahn et al. |
| 2009/0308365 A1 | 12/2009 | Atkinson et al. |
| 2010/0019505 A1 | 1/2010 | Frost |
| 2011/0108360 A1* | 5/2011 | DiBenedetto ........... F01D 25/18 184/6.11 |
| 2014/0069743 A1 | 3/2014 | Xu |
| 2014/0093356 A1 | 4/2014 | Stutz et al. |
| 2014/0150439 A1 | 6/2014 | Pamin et al. |
| 2014/0174858 A1* | 6/2014 | Remer ...................... F02C 7/06 184/106 |
| 2014/0256494 A1 | 9/2014 | Lewis et al. |

* cited by examiner

LUBRICATION SYSTEM FOR A RECONFIGURABLE GAS TURBINE ENGINE

CROSS REFERENCE TO RELATED APPLICATIONS

This application claims priority to and the benefit of U.S. Provisional Patent Application No. 62/163,700, filed 19 May 2015, the disclosure of which is now expressly incorporated herein by reference.

FIELD OF THE DISCLOSURE

The present disclosure relates generally to gas turbine assemblies, and more specifically to lubrication systems used with gas turbine assemblies.

BACKGROUND

A gas turbine assembly can include a gas turbine engine and a gearbox. During operation of the gas turbine assembly, the gas turbine engine provides power to the gearbox and the gearbox converts the work of the gas turbine engine for output. Gas turbine assembly gearbox is typically lubricated by a lubrication system which may include various sumps, pumps, and distribution lines.

A gas turbine assembly can have various potential configurations, including various orientations. The various potential configurations of a gas turbine assembly can affect the operation of the sumps, pumps, and distributions lines of the assembly's lubrication system. The assembly's lubrication system can be configured to correspond to a specific configuration of the gas turbine assembly. Traditionally, configuring and verifying correspondence of a lubrication system to a specific configuration of the gas turbine assembly may require one or more of gearbox disassembly, gas turbine engine disassembly, modification of gearbox internals, and or selection from multiple gearboxes variations stored in inventory.

SUMMARY

The present disclosure may comprise one or more of the following features and combinations thereof.

According to one aspect of the disclosure, a lubrication system for a gas turbine assembly includes a pump adapted to pressurize oil distributed from the lubrication system, a first sump located within a housing and configured to collect oil moved into the first sump by way of gravitational force when the housing is arranged in a first orientation, a second sump located within the housing and configured to collect oil moved into the second sump by way of gravitational force when the housing is arranged in a second orientation, and a manifold. The manifold is fluidly coupled to the pump by a pump line, to the first sump by a first-sump line, and to the second sump by a second-sump line. The manifold includes a lubrication system configuration plate configured to fluidly couple the pump line to one of the first-sump line and the second-sump line.

In illustrative embodiments, the lubrication system configuration plate is configured to block fluid communication between the pump line and one of the first-sump line and the second-sump line.

In illustrative embodiments, at least a portion of the first-sump line and the second sump line are integrally formed in the housing.

In illustrative embodiments, the manifold includes a plenum formed to include a pump aperture opening into the pump line, a first-sump aperture opening into the first-sump line, and a second-sump aperture opening into the second-sump line.

In illustrative embodiments, the plenum is integrally formed in the housing.

In illustrative embodiments, the lubrication system configuration plate includes a cap configured to cover the plenum and a plug extending from the cap into the plenum to block fluid communication into the plenum from one of the first-sump aperture and the second-sump aperture.

In illustrative embodiments, the housing includes an accessory-attachment pad and the lubrication system configuration plate includes a tab that extends from the cap over at least a portion of the accessory-attachment pad to block the installation of an accessory onto the accessory-attachment pad.

In illustrative embodiments, the first orientation is offset from the second orientation by about 180 degrees.

In another aspect of the disclosure, a reconfigurable gas turbine assembly includes a turbine engine including an air inlet, an engine core, and an exhaust; and a gearbox including a lubrication system. The lubrication system includes a pump, a first sump arranged within a housing, a second sump arranged within the housing, and a manifold. The manifold is fluidly coupled to the pump by a pump line, to the first sump by a first-sump line, and to the second sump by a second-sump line. The first sump is arranged to collect oil moved by way of gravitational force the when the exhaust of the turbine assembly is oriented upwardly. The second sump is arranged to collect oil moved by way of gravitational force the when the exhaust of the turbine assembly is oriented downwardly. The manifold includes a lubrication system configuration plate configured to fluidly couple the pump line with one of the first-sump line and the second-sump line.

In illustrative embodiments, the housing supports a gear set in fluid communication with the lubrication system.

In illustrative embodiments, the lubrication system configuration plate is further configured to block fluid communication between the pump line and one of the first-sump line and the second-sump line.

In illustrative embodiments, at least a portion of the first-sump line and the second sump line are integrally formed in the housing.

In illustrative embodiments, the manifold includes a plenum formed to include a pump aperture opening into the pump line, a first-sump aperture opening into the first-sump line, and a second-sump aperture opening into the second-sump line.

In illustrative embodiments, the plenum is integrally formed in the housing.

In illustrative embodiments, the lubrication system configuration plate includes a cap configured to cover the plenum and a plug extending from the cap into the plenum to block fluid communication into the plenum from one of the first-sump aperture and the second-sump aperture.

In illustrative embodiments, the housing includes an accessory-attachment pad and the lubrication system configuration plate includes a tab that extends from the cap over at least a portion of the accessory-attachment pad to block the installation of an accessory onto the accessory-attachment pad.

In illustrative embodiments, the first sump is arranged below the second sump when the exhaust of the turbine assembly is oriented upwardly and the second sump is arranged below the first sump when the exhaust of the turbine assembly is oriented downwardly.

In illustrative embodiments, the second sump is arranged generally between the exhaust of the turbine assembly and the first sump.

In another aspect of the disclosure, a method of assembling a lubrication system for a reconfigurable gas turbine assembly includes fluidly coupling a pump to a plenum via a pump line, fluidly coupling a first sump to the plenum via a first-sump line, fluidly coupling a second sump to the plenum via a second-sump line, and blocking fluid communication into plenum from one of the first sump and the second sump by coupling a lubrication system configuration plate to the plenum. The lubrication system configuration plate includes a cap configured to cover the plenum and a plug extending from the cap through the plenum into one of the first-sump line or the second-sump line to block fluid communication into the plenum from one of the first sump and the second sump.

In illustrative embodiments, the first sump and the second sump are arranged in a housing and the housing is formed to include at least a portion of the first-sump line and the second-sump line.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1A:
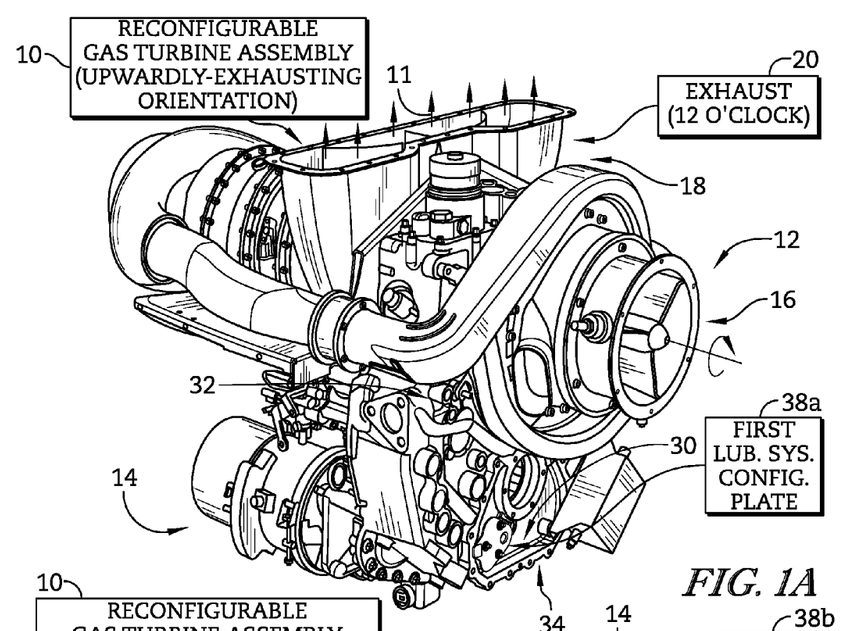
FIG. 1A is a perspective view of a reconfigurable gas turbine engine positioned in an upwardly-exhausting orientation, the reconfigurable gas turbine engine including a lubrication system configured for use when the gas turbine engine is in the upwardly-exhausting orientation by a first lubrication system configuration plate.
Figure 2A:
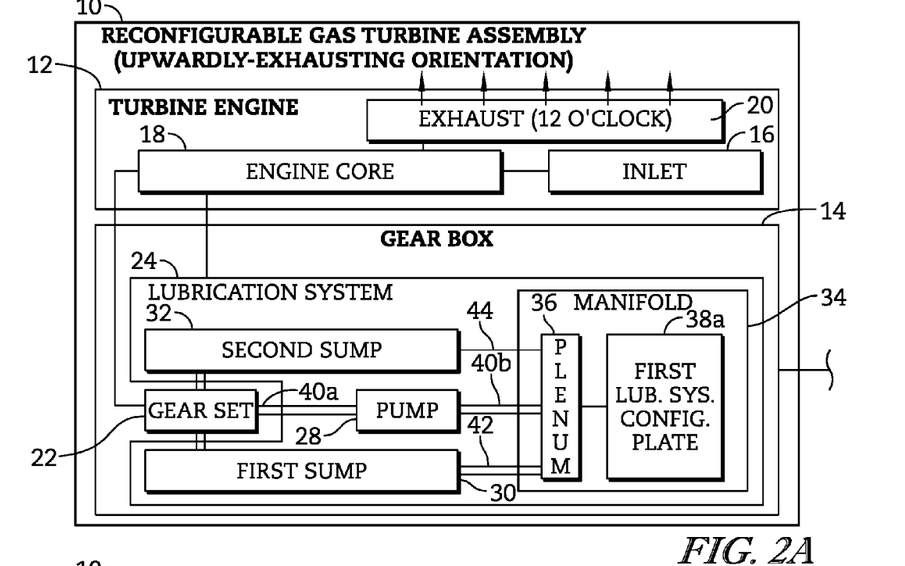
FIG. 2A is a diagrammatic view of the reconfigurable gas turbine engine of FIG. 1A with the gas turbine engine positioned in the upwardly-exhausting orientation showing that the lubrication system includes a pump for pushing oil toward a gear set to be lubricated and a first sump arranged to collect used oil moved by way of gravity out of the gear set while the gas turbine engine is in the upwardly-exhausting orientation, and showing that the first lubrication system configuration plate fluidly couples the pump to the first sump.

FIGS. 1A and 2A show an illustrative reconfigurable gas turbine assembly 10 configured for use in an upwardly-exhausting orientation. The upwardly-exhausting orientation is indicated by orientation of an exhaust outlet 20 to extend upward to direct exhaust gases 11 upward from the assembly 10. When the assembly 10 is in the upwardly-exhausting orientation, a lubrication system 24 of the assembly 10, which has a first sump 30 and a second sump 32, is configured to use its first sump 30. The lubrication system 24 is configured to use the first sump 30 by attachment of a first lubrication system configuration plate 38a to fluidly couple a pump 28 to the first sump 30.

Figure 1B:
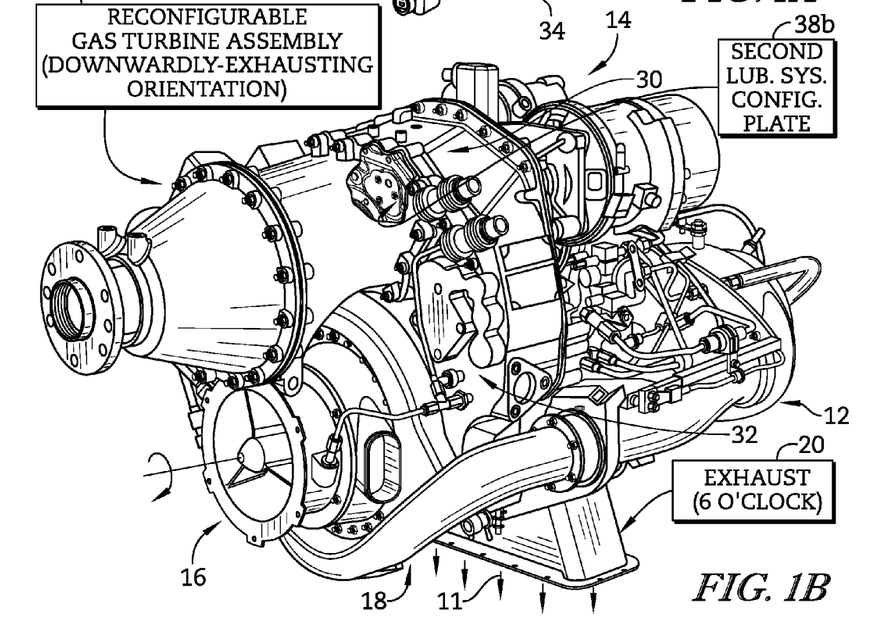
FIG. 1B is a perspective view of the reconfigurable gas turbine engine similar to that in FIG. 1A but positioned in an downwardly-exhausting orientation, the lubrication system of the reconfigurable gas turbine engine reconfigured for use when the gas turbine engine is in the downwardly-exhausting orientation by a second lubrication system configuration plate.
Figure 2B:
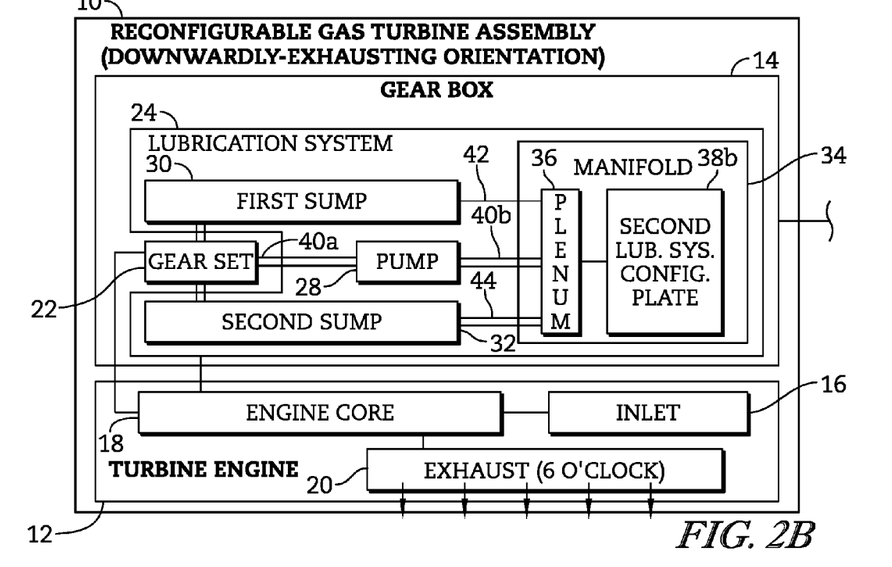
FIG. 2B is a diagrammatic view of the reconfigurable gas turbine engine of FIG. 1B with the gas turbine engine positioned in the downwardly-exhausting orientation showing that the lubrication system includes a pump for pushing oil toward a gear set to be lubricated and a second sump arranged to collect used oil moved by way of gravity out of the gear set while the gas turbine engine is in the upwardly-exhausting orientation, and showing that the second lubrication system configuration plate fluidly couples the pump to the second sump.

FIGS. 1B and 2B show the illustrative reconfigurable gas turbine assembly 10 configured for use in a downwardly-exhausting orientation. The downwardly-exhausting orientation of the assembly 10 is indicated by orientation of the exhaust outlet 20 to extend downward to direct exhaust gases 11 downward from the assembly 10. When the assembly 10 is in the downwardly-exhausting orientation, the lubrication system 24 of the assembly 10 is configured to use the second sump 32. The lubrication system 24 is configured to use the second sump 32 by attachment of a second lubrication system configuration plate 38b to fluidly couple the pump 28 to the second sump 32.

The reconfigurable gas turbine assembly 10 includes a turbine engine 12 and an gear box 14, as shown illustratively in FIGS. 1A and 1B and diagrammatically in FIGS. 2A and 2B. The turbine engine 12 includes a combustion air inlet 16, an engine core 18, and the exhaust outlet 20. The exhaust outlet 20 extends from the turbine engine 12 in an upward or downward direction away from the engine core 18, depending on the orientation of the assembly 10, as illustratively shown in FIGS. 1A and 1B. The gear box 14 is configured to step up or step down rotational energy from the turbine engine 12 so that the turbine engine 12 can be used with a propeller, a power take-off shaft, or the like.

The gear box 14 illustratively extends above or below the turbine engine 12 depending on the orientation of the assembly 10, as shown in FIGS. 1A and 1B. The gear box 14 includes a gear set 22 and the lubrication system 24, as shown in FIGS. 2A and 2B. The lubrication system 24 is configured to collect and recirculate lubricant drained from the gear set 22 onto portions of the gear set 22 requiring lubrication. The lubrication system 24 of the gear box 14 includes the pump 28; the first sump 30; the second sump 32; lubrication lines 40a, 40b, 42, 44; and a manifold 34. Illustratively, the manifold 34 includes a plenum 36 being closed at one end by the lubrication system configuration plate 38a, 38b that sets the configuration of the lubrication system 24.

The illustrative reconfigurable gas turbine assembly 10 in the upwardly-exhausting orientation includes the first lubrication system configuration plate 38a to fluidly couple the pump 28 to the first sump 30 as shown in FIGS. 1A and 2A. In contrast, the illustrative reconfigurable gas turbine assembly 10 in the downwardly-exhausting orientation includes the second lubrication system configuration plate 38b to fluidly couple the pump 28 to the second sump 32, as shown in FIGS. 1B and 2B. Therefore, upward orientation of the exhaust outlet 20 of the gas turbine assembly 10 corresponds with attachment of the first lubrication system configuration plate 38a and fluid coupling of the first sump 30 with the pump 28 (shown in FIGS. 1A and 2A). Further, the downward orientation of the exhaust outlet 20 of the gas turbine assembly 10 corresponds with attachment of the second lubrication system configuration plate 38b and fluid coupling of the second sump 32 with the pump 28 (shown in FIGS. 1B and 2B).

The illustrative pump 28 is a single unit, shaft-driven, direct drive, centrifugal lubricant pump, configured for receiving mechanical power from the turbine engine 12 to pressurize lubricant from the gear set 22. The pump 28 illustratively has a single dedicated inlet 40a and outlet 40b lubricant lines, as shown in FIGS. 2A and 2B. In some embodiments, the pump 28 may be one or more pumps, of the same or different sizes, having direct or indirect drives, may have dedicated or manifold inlet and or outlet lubricant lines, and may be centrifugal or positive displacement pumps, and or any combination thereof.

The pump 28 of the lubrication system 24 draws lubricant from one of the first sump 30 and the second sump 32 for distribution to the gear set 22, as shown in FIGS. 2A and 2B. Lubricant within the gear set 22 flows into one of the first sump 30 and the second sump 32 according to the configuration of the assembly 10.

Lubricant flows from the gear set 22 into the first sump 30 when the assembly 10 is configured in the upwardly-exhausting orientation as suggested in FIG. 2A. The first sump 30 is illustratively arranged at a lower elevation than the gear set 22 such that lubricant flows by gravity from the gear set 22 through first sump line 46 to the first sump 30, as shown in FIG. 2A. In some embodiments, the first sump 30 may be defined by a portion of a housing 50 of the gear set 22. In some embodiments, first sump line 46 may be eliminated for direct flow of lubricant from the gear set 22 to the first sump 30. In some embodiments, lubricant may be displaced from the gear set 22 to the first sump 30 by mechanical means, for example by a pump.

When the assembly is configured in the downwardly-exhausting orientation, lubricant flows from the gear set 22 into the second sump 32 as suggested in FIG. 2B. The second sump 32 is illustratively arranged at a lower elevation than the gear set 22 such that lubricant flows by gravity from the gear set 22 through second sump line 48 to the second sump 32. In some embodiments, the second sump 32 may be defined by a portion of the housing 50 of the gear set 22. In some embodiments, second sump line 48 may be eliminated for direct flow of lubricant from the gear set 22 to the second sump 32. In some embodiments, lubricant may be displaced from the gear set 22 to the second sump 32 by direct mechanical means, for example by a pump.

The lubrication lines 40a, 40b, 42, and 44 of the lubrication system 24 communicate lubricant through the gear box 14, as shown in FIGS. 2A and 2B. Lubricant is sent to the gear set 22 from the pump 28 through lubricant line 40a. Lubricant is drawn by the pump 28 from one of the first sump 30 and the second sump 32 through their corresponding lines 42, 44, according to the configuration of the assembly 10. Lubricant drawn by the pump 28 through lines 42, 44 enters the manifold 34 and flows into the plenum 36. The pump 28 receives lubricant from the plenum 36 of the manifold 34 through lubricant line 40a. Whether lubricant is drawn from the first sump 30 or the second sump 32 is set based on the configuration of the manifold 34 of the lubrication system 24, according to the configuration of the assembly 10.

The manifold 34 includes the plenum 36 and the lubrication system configuration plate 38a, 38b, as shown in FIGS. 2A and 2B. The plenum 36 is illustratively cast into the housing 50 such that the plenum 36 is an integral or monolithic part of the housing 50. The configuration plates 38a, 38b are configured to be coupled to the plenum 36 by studs 37 and are sized to cover the plenum 36.

Figure 3:
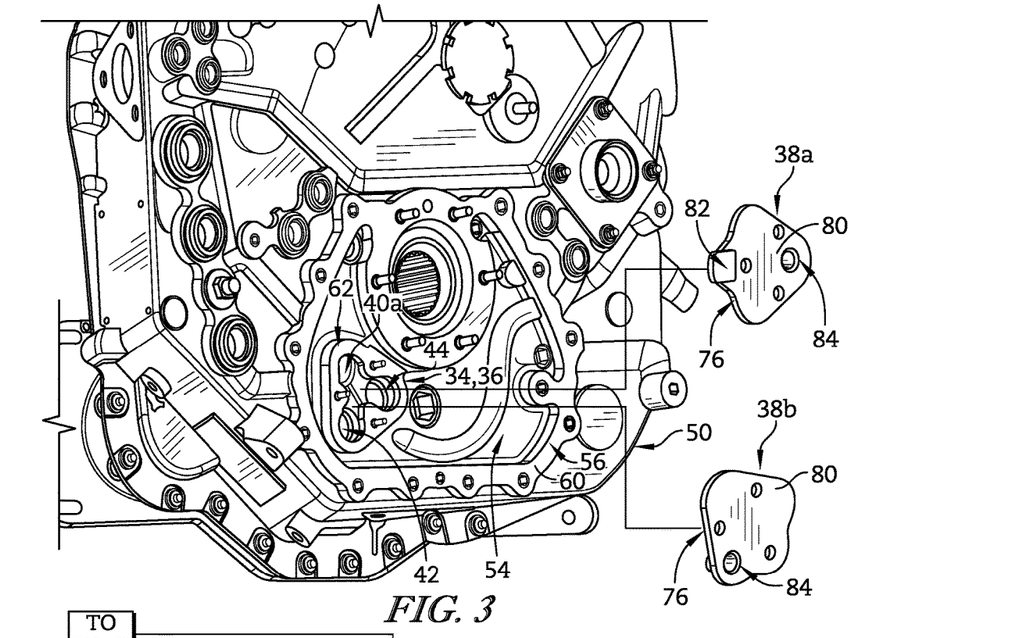
FIG. 3 is an exploded perspective view of a manifold included in the lubrication system of the reconfigurable gas turbine engine shown in FIGS. 1A and 1B, illustrating exemplary first and second lubrication system configuration plates for attachment to a plenum included in the lubrication system.
Figure 4:
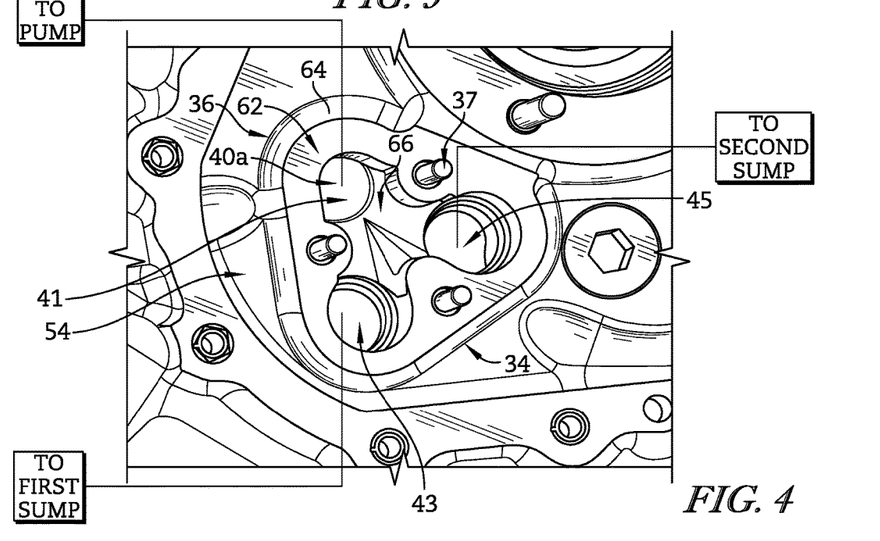
FIG. 4 is a detail perspective view of the plenum of the manifold shown in FIG. 3, illustrating a pump line, a first-sump line, and a second-sump line opening into the plenum.

The plenum 36 of the manifold 34 is illustratively defined by a wall 62 which extends outwardly from an outer portion 54 of the housing 50 to form a plenum end surface 64 as shown in FIGS. 3 and 4. The illustrative plenum end surface 64 is disposed on an end of the wall 62 and is configured for coupling with the lubrication system configuration plates 38a, 38b. The plenum end surface 64 is illustratively flat, spaced apart from the outer portion 54 of the housing 50, and contiguously defines the plenum 36 of the manifold 34. In some embodiments, the plenum 36 may be distinct or separate from the housing 50 of the gear box 14, may have any shape, subcomponents, and or features to create configuration for attachment of the lubrication system configuration plate 38a, 38b, to enclose the plenum 36.

The plenum 36 defines a plenum cavity 66 the periphery of which is defined by the wall 62, as illustratively shown in FIG. 4. The outer portion 54 of the housing 50 defines an inner-interior side 68 of the plenum cavity 66, the inner-interior side 68 having apertures 41, 43, 45 in respective communication with the lubricant lines 40a, 42, and 44 to provide fluid coupling of lubricant with the plenum cavity 66. The apertures 41, 43, 45 of the plenum 36 are illustratively formed integrally with the housing 50, as shown in FIG. 4. An outer-interior side 70 of the plenum cavity 66 is defined by the lubrication system configuration plate 38a, 38b.

The lubrication system configuration plate 38a, 38b, defines the outer-interior side 70 of the plenum cavity 66 of the plenum 36, as illustratively shown in FIGS. 5A, 5B, 6A, and 6B. The lubrication system configuration plate 38a, 38b includes the first lubrication system configuration plate 38a and the second lubrication configuration plate 38b each of which are configured for selective attachment to the plenum 36, as illustrated in FIG. 3. The first lubrication system configuration plate 38a and the second lubrication configuration plate 38b illustratively each include cap 72 and a plug 74.

The cap 72 of each plate 38a, 38b is illustratively embodied as a flat plate having an inner surface 76 which can define the outer-interior side 70 of the plenum cavity 66 upon attachment of the individual lubrication system configuration plate 38a, 38b to the plenum 36, as illustratively shown in FIGS. 5A, 5B, 6A, and 6B. The cap 72 of each plate 38a, 38b includes an outer surface 80 facing away from the plenum 36 during attachment thereto. The plug 74 of each lubrication system configuration plate 38a, 38b, is illustratively embodied as a cylinder extending longitudinally from the inner surface 76 and including a ring seal 78. Each plug 74 is configured to block fluid communication of lubricant through one of the apertures 43, 45 of the plenum 36 upon attachment of the lubrication system configuration plate 38a, 38b to the plenum 36. The orientation of each plug 74 on the cap 72 is indicated by a cylindrical depression 84 formed on the outer surface 80 of each plate corresponding to the orientation of the respective plug 74.

Figure 5:
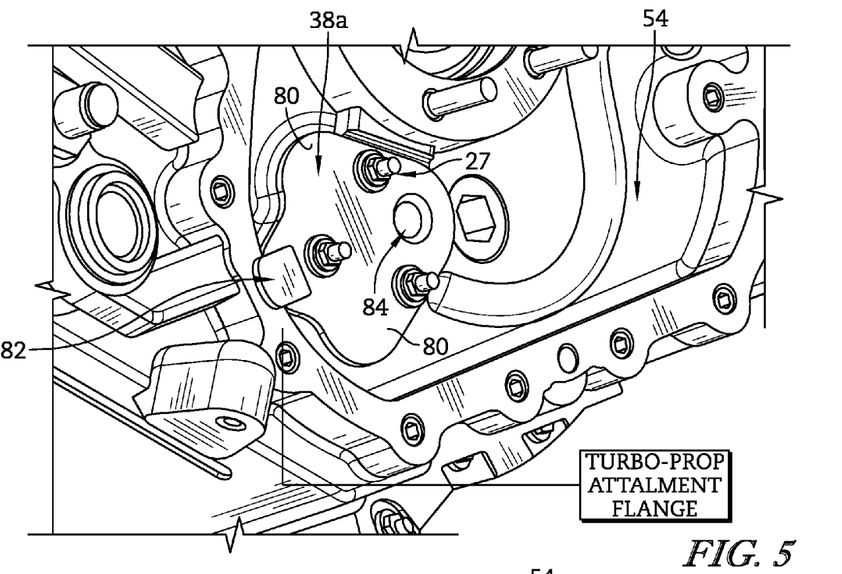
FIG. 5 is a perspective view of the manifold of the reconfigurable gas turbine assembly of FIG. 1A, the plenum having the first lubrication system configuration plate attached thereto to fluidly couple the pump to the first sump through the plenum and to block fluid communication between the pump and the second sump.
Figure 6:
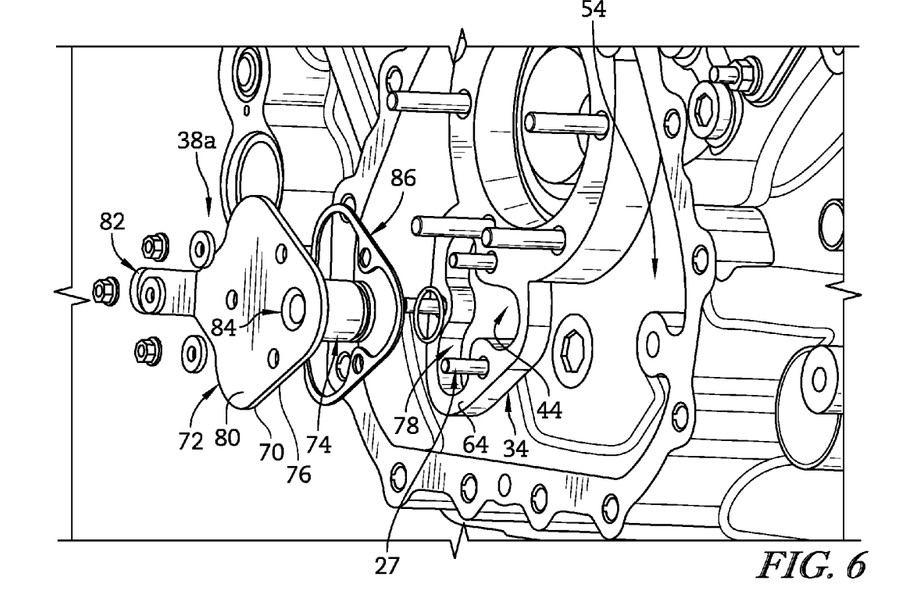
FIG. 6 is an exploded perspective view of the manifold of FIG. 5 illustrating that the first lubrication system configuration plate includes a cap sized to close the plenum, a plug extending from the cap to block fluid communication from the second sump into the plenum, and a tab extending from the cap to lie over an accessory-attachment pad adjacent to the plenum.
Figure 7:
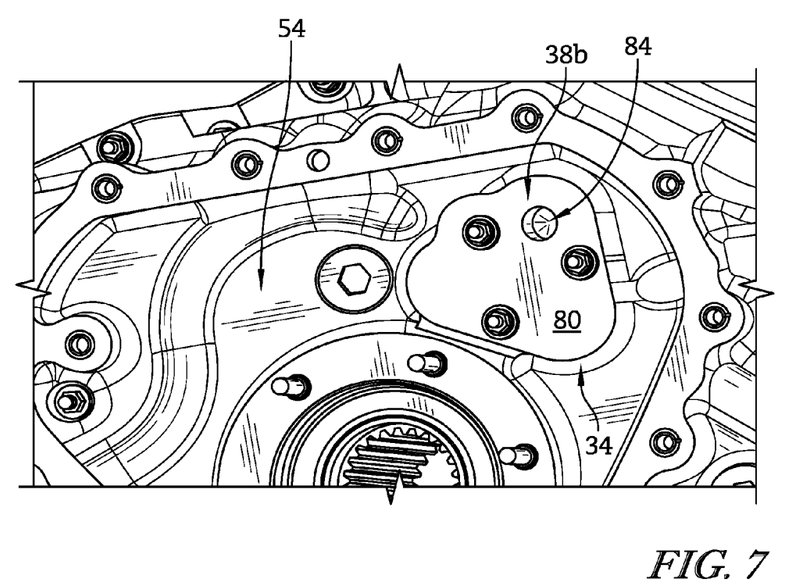
FIG. 7 is a perspective view of the manifold of the reconfigurable gas turbine assembly of FIG. 1B, the plenum having the second lubrication system configuration plate attached thereto to fluidly couple the pump to the second sump through the plenum and to block fluid communication from the first sump into the plenum.
Figure 8:
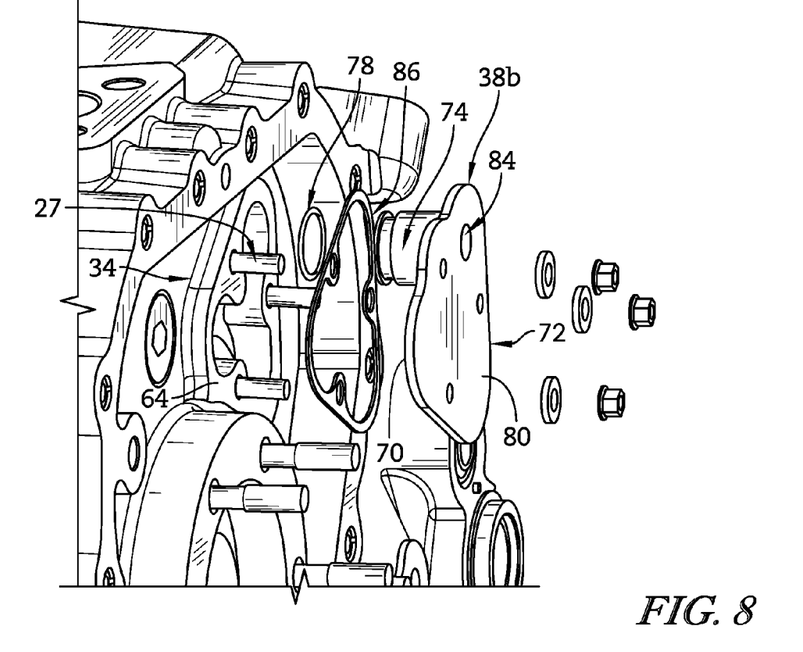
FIG. 8 is an exploded perspective view of the manifold of FIG. 7 illustrating that the first lubrication system configuration plate includes a cap sized to close the plenum and a plug extending from the cap to block fluid communication between the first sump and the plenum, and showing that the second lubrication system configuration plate does not extend over the accessory-attachment pad thereby allowing an accessory to be attached.

The cap 72 of the first lubrication system configuration plate 38a, as illustratively shown in FIGS. 3, 5, and 6, includes a prevention tab 82 that it lies over an accessory attachment flange 52 formed as part of the housing 50 to prevent attachment of an accessory to the flange 52 when the first lubrication system configuration plate 38a is attached to the plenum 36. The prevention tab 82 illustratively extends from the outer surface 80 of the first plate 38a in a direction opposite the plenum 36. The prevention tab 82 turns orthogonally at a distance from the outer portion 54 of the housing 50 approximately equal to that of a flange end surface 60 until it lies across at least a portion of the flange end surface 60 to prevent attachment of an accessory, as shown in FIG. 5. The accessory-attachment flange 52 illustratively extends outwardly from the outer portion 54 of the housing 50 to form the flange end surface 60, as shown in FIG. 3. The accessory-attachment flange 52 illustratively contiguously surrounds the plenum 36 of the manifold 34.

When attached to the plenum 36, the first lubrication configuration plate 38a configures the lubrication system 24 of the assembly 10 to fluidly couple the pump 28 to the first sump 30, as illustratively shown in FIG. 2A. When the first lubrication system configuration plate 38a fluidly couples the pump 28 to the first sump 30, the apertures 41 and 43 remain open to the plenum cavity 66 to allow communication of lubricant through lines 42, 40a, and 40b, as suggested in FIG. 2A.

The first lubrication configuration plate 38a attaches to the plenum 36 and thereby configures the lubrication system 24 of the assembly 10 to block fluid communication into the plenum cavity 66, as illustratively shown in FIG. 2A. When the first lubrication system configuration plate 38a configures the lubrication system 24 to block fluid communication into the plenum cavity 66, the plug 74 is inserted into the aperture 45 to prevent communication of lubricant through line 44 into the plenum 36, as illustratively shown in FIG. 2A. When the plug 74 is inserted into the aperture 45, the ring seal 78 is compressed between an outer surface of the plug 74 and the inner surface of the aperture 45 to provide liquid-tight sealing.

When attached to the plenum 36, the second lubrication configuration plate 38b configures the lubrication system 24 of the assembly 10 to fluidly couple the pump 28 to the second sump 32, as illustratively shown in FIG. 2B. When the second lubrication system configuration plate 38b fluidly couples the pump 28 to the second sump 32, the apertures 41 and 45 remain open to the plenum cavity 66 to allow communication of lubricant through lines 44, 40a, and 40b, as suggested in FIG. 2B.

The second lubrication configuration plate 38b attaches to the plenum 36 and thereby configures the lubrication system 24 of the assembly 10 to block fluid communication from the first sump 30 into the plenum cavity 66, as illustratively shown in FIG. 2B. When the second lubrication system configuration plate 38b configures the lubrication system 24 to block fluid communication from the first sump 30 into the plenum cavity 66, the plug 74 is inserted into the aperture 43 to prevent communication of lubricant through line 42 into the plenum 36, as illustratively shown in FIG. 2B. When the plug 74 is inserted into the aperture 43, the ring seal 78 is compressed between an outer surface of the plug 74 and the inner surface of the aperture 43 to provide liquid-tight sealing. In some embodiments, the lubrication configuration plates 38a, 38b may include a gasket 86 for interface sealing between the plenum end surface 64 and the inner surface 76 of the cap 72.

Gas turbine assemblies such as those used in RR500 helicopter engine assemblies have three configurations from the perspective of the gearbox. A lubricant pump of the assembly must be able to draw from a first or a second sump. The gearbox has internal plumbing that is connected through the manifold that enables configuration to switch the oil pump suction between the two sumps. The illustrative arrangements allow configuration of the pump suction to be verified externally and visually in a manner that minimizes the opportunity for misconfiguration. The illustrative arrangements permit verification of the configuration of the lubrication assembly with little or no gearbox or engine teardown, and permit fewer types of gearboxes to be kept on hand to support production of various gas turbine assemblies. A configuration plate that sets the configuration of the lubrication system can prevent the addition of a propeller gearbox.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A lubrication system for a gas turbine assembly, the lubrication system comprising
    a pump adapted to pressurize oil distributed from the lubrication system,
    a first sump located within a housing and configured to collect oil moved into the first sump by way of gravitational force when the housing is arranged in a first orientation, a second sump located within the housing and configured to collect oil moved into the second sump by way of gravitational force when the housing is arranged in a second orientation, and a manifold fluidly coupled to the pump by a pump line, to the first sump by a first-sump line, and to the second sump by a second-sump line, the manifold including a lubrication system configuration plate configured to fluidly couple the pump line to one of the first-sump line and the second-sump line.

2. The lubrication system of claim 1, wherein the lubrication system configuration plate is further configured to block fluid communication between the pump line and one of the first-sump line and the second-sump line.

3. The lubrication system of claim 2, wherein at least a portion of the first-sump line and the second sump line are integrally formed in the housing.

4. The lubrication system of claim 2, wherein the manifold includes a plenum formed to include a pump aperture opening into the pump line, a first-sump aperture opening into the first-sump line, and a second-sump aperture opening into the second-sump line.

5. The lubrication system of claim 4, wherein the plenum is integrally formed in the housing.

6. The lubrication system of claim 4, wherein the lubrication system configuration plate includes a cap configured to cover the plenum and a plug extending from the cap into the plenum to block fluid communication into the plenum from one of the first-sump aperture and the second-sump aperture.

7. The lubrication system of claim 6, wherein the housing includes an accessory-attachment pad and the lubrication system configuration plate includes a tab that extends from the cap over at least a portion of the accessory-attachment pad to block the installation of an accessory onto the accessory-attachment pad.

8. The lubrication system of claim 1, wherein the first orientation is offset from the second orientation by about 180 degrees.

9. A reconfigurable gas turbine assembly comprising
a turbine engine including an air inlet, an engine core, and an exhaust, and
a lubrication system including a pump, a first sump arranged within a housing, a second sump arranged within the housing, and a manifold fluidly coupled to the pump by a pump line, to the first sump by a first-sump line, and to the second sump by a second-sump line,
wherein the first sump is arranged to collect oil moved by way of gravitational force the when the exhaust of the reconfigurable gas turbine assembly is oriented upwardly, the second sump is arranged to collect oil moved by way of gravitational force the when the exhaust of the turbine engine is oriented downwardly, and the manifold includes a lubrication system configuration plate configured to fluidly couple the pump line with one of the first-sump line and the second-sump line.

10. The reconfigurable gas turbine assembly of claim 9, wherein the housing supports a gear set in fluid communication with the lubrication system.

11. The reconfigurable gas turbine assembly of claim 9, wherein the lubrication system configuration plate is further configured to block fluid communication between the pump line and one of the first-sump line and the second-sump line.

12. The reconfigurable gas turbine assembly of claim 9, wherein at least a portion of the first-sump line and the second sump line are integrally formed in the housing.

13. The reconfigurable gas turbine assembly of claim 9, wherein the manifold includes a plenum formed to include a pump aperture opening into the pump line, a first-sump aperture opening into the first-sump line, and a second-sump aperture opening into the second-sump line.

14. The reconfigurable gas turbine assembly of claim 13, wherein the plenum is integrally formed in the housing.

15. The reconfigurable gas turbine assembly of claim 13, wherein the lubrication system configuration plate includes a cap configured to cover the plenum and a plug extending from the cap into the plenum to block fluid communication into the plenum from one of the first-sump aperture and the second-sump aperture.

16. The reconfigurable gas turbine assembly of claim 9, wherein the housing includes an accessory-attachment pad and the lubrication system configuration plate includes a tab that extends from the cap over at least a portion of the accessory-attachment pad to block the installation of an accessory onto the accessory-attachment pad.

17. The reconfigurable gas turbine assembly of claim 9, wherein the first sump is arranged below the second sump when the exhaust of the reconfigurable gas turbine assembly is oriented upwardly and the second sump is arranged below the first sump when the exhaust of the reconfigurable gas turbine assembly is oriented downwardly.

18. The reconfigurable gas turbine assembly of claim 9, wherein the second sump is arranged generally between the exhaust of the reconfigurable gas turbine assembly and the first sump.

19. A method of assembling a lubrication system for a reconfigurable gas turbine assembly, the method comprising
fluidly coupling a pump to a plenum via a pump line,
fluidly coupling a first sump to the plenum via a first-sump line,
fluidly coupling a second sump to the plenum via a second-sump line, and
blocking fluid communication into plenum from one of the first sump and the second sump by coupling a lubrication system configuration plate to the plenum, the lubrication system configuration plate including a cap configured to cover the plenum and a plug extending from the cap through the plenum and into one of the first-sump line or the second-sump line to block fluid communication into the plenum from one of the first sump and the second sump.

20. The method of claim 19, wherein the first sump and the second sump are arranged in a housing and the housing is formed to include at least a portion of the first-sump line and the second-sump line.

* * * * *